US010709272B2

(12) United States Patent
Casas

(10) Patent No.: US 10,709,272 B2
(45) Date of Patent: Jul. 14, 2020

(54) FOOD STORAGE AND SERVING HOLDER

(71) Applicant: Jeronimo Casas, Whittier, CA (US)

(72) Inventor: Jeronimo Casas, Whittier, CA (US)

(*) Notice: Subject to any disclaimer, the term of this patent is extended or adjusted under 35 U.S.C. 154(b) by 0 days.

(21) Appl. No.: 16/409,340

(22) Filed: May 10, 2019

(65) Prior Publication Data
US 2019/0350392 A1 Nov. 21, 2019

Related U.S. Application Data
(60) Provisional application No. 62/673,512, filed on May 18, 2018.

(51) Int. Cl.
A47G 19/30 (2006.01)
A47J 47/08 (2006.01)
B65D 43/18 (2006.01)
B65D 25/06 (2006.01)
B65D 25/00 (2006.01)

(52) U.S. Cl.
CPC .............. A47G 19/30 (2013.01); A47J 47/08 (2013.01); B65D 25/06 (2013.01); B65D 43/18 (2013.01); B65D 25/005 (2013.01)

(58) Field of Classification Search
CPC ......... A47G 19/30; A47J 47/08; B65D 25/06; B65D 43/18; B65D 25/005
USPC .......................................................... 220/556
See application file for complete search history.

(56) References Cited

U.S. PATENT DOCUMENTS

| | | | | | |
|---|---|---|---|---|---|
| 346,166 | A | * | 7/1886 | Linnell | A47B 53/00 312/299 |
| 1,155,562 | A | * | 10/1915 | Gilchrist | A47F 1/085 221/287 |
| 2,800,382 | A | * | 7/1957 | Engstrom | A01K 97/06 312/305 |
| 3,807,826 | A | * | 4/1974 | Peckenpaugh | A47B 49/004 312/305 |
| 4,151,910 | A | * | 5/1979 | Yasur | B65D 25/06 206/216 |
| 4,311,237 | A | * | 1/1982 | Hayes | A47G 23/08 206/203 |
| 4,367,844 | A | * | 1/1983 | Drummond | A47G 29/1209 232/17 |
| 4,381,059 | A | * | 4/1983 | Schurman | A61J 7/04 116/308 |
| 4,616,752 | A | * | 10/1986 | Ridgley | A61J 1/03 206/521 |
| D355,314 | S | * | 2/1995 | Travis | D6/675.1 |
| 5,456,530 | A | * | 10/1995 | Blaize | A47B 49/004 312/305 |
| 5,640,979 | A | * | 6/1997 | Trenary | A45D 29/17 132/73 |
| 6,073,394 | A | * | 6/2000 | Uhl | E05F 15/641 49/41 |
| 6,481,014 | B1 | * | 11/2002 | Banks | F25D 3/08 220/592.17 |

(Continued)

Primary Examiner — Ernesto A Grano
(74) Attorney, Agent, or Firm — Kenneth L. Green; Averill & Green

(57) ABSTRACT

A holder for storing, warming and serving flat food items such as tortillas and flatbreads includes two or more round shelves spaced apart in a food storage area within a generally cylindrical housing. The holder is suitable for use in the refrigerator, microwave and dishwasher. The holder may also include a top cover or lid and a moveable door to enclose the food items on the shelves.

17 Claims, 3 Drawing Sheets

(56) References Cited

U.S. PATENT DOCUMENTS

| | | | | |
|---|---|---|---|---|
| 8,067,705 B2* | 11/2011 | Izumo | ............... | G01G 21/30 |
| | | | | 177/180 |
| 2013/0047558 A1* | 2/2013 | Hogan | ............... | B65D 21/022 |
| | | | | 53/471 |
| 2013/0174831 A1* | 7/2013 | Shaffer | ............... | F24C 15/023 |
| | | | | 126/190 |
| 2015/0208840 A1* | 7/2015 | Honeycutt | ............... | A47G 19/30 |
| | | | | 414/800 |
| 2019/0101324 A1* | 4/2019 | Cubeiro Martinez | ............... | |
| | | | | F25D 23/067 |

* cited by examiner

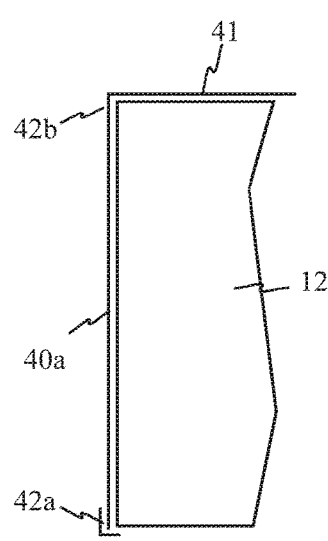
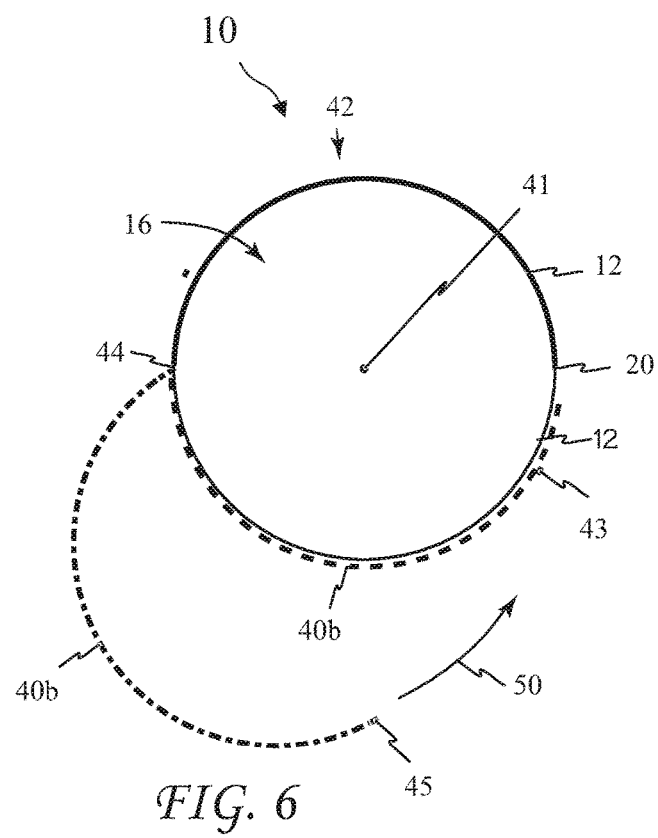
FIG. 5B
FIG. 6
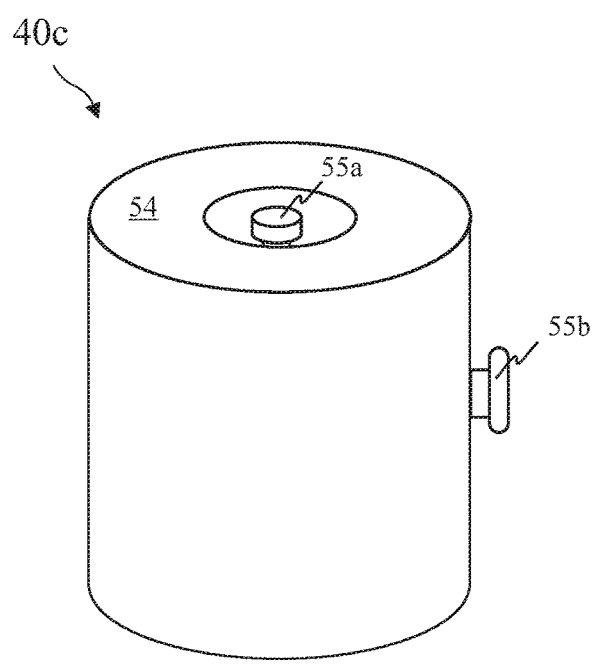
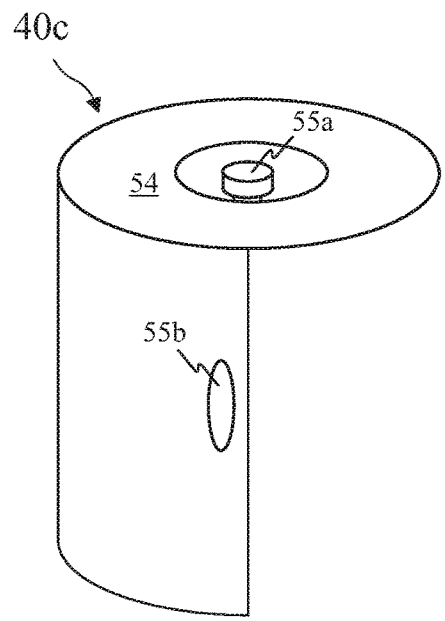
FIG. 7
FIG. 8

FOOD STORAGE AND SERVING HOLDER

CROSS-REFERENCE TO RELATED APPLICATIONS

The present application claims the priority of U.S. Provisional Patent Application Ser. No. 62/673,512 filed May 18, 2018, which application is incorporated in its entirety herein by reference.

BACKGROUND OF THE INVENTION

The present invention relates to the field of holders or containers for storing, warming and serving food.

Flat food items such as tortillas, flatbreads such as nan and pita are ubiquitous in their respective food cultures and the equipment for serving, storing and warming them has remained unchanged for thousands of years. Known container include a bottom resting on a support surface. When such containers are stored in a refrigerator, the direct contact of the container bottom with the surface may results in condensation inside the container and harm to food inside the container. An improved container is needed to reduce or eliminate such condensation.

BRIEF SUMMARY OF THE INVENTION

The present invention addresses the above and other needs by providing a holder for storing, warming and serving flat food items such as tortillas and flatbreads. The food holder includes two or more round shelves spaced apart vertically in a food storage area within a generally cylindrical housing. The holder is suitable for use in the refrigerator, microwave and dishwasher. The holder may also include a removable top cover or lid and/or an opening door to enclose the food items on the shelves.

In accordance with one aspect of the invention, there is provided a food holder supported above a support surface by at least three legs. Such legs provide a gap between a bottom of the holder and a refrigerator surface to reduce or eliminate condensation in the holder.

In accordance with one aspect of the invention, there is provided a food holder having an open front and a lift off or rotating door. The open front spans about 180 degrees to allow removing food item, for example tortillas, without bending and possibly tearing the tortillas.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5B is a cross-sectional view of the storing, warming and serving holder including a second sliding door according to the present invention taken along line 5-5 of FIG. 4.

FIG. 6 is a top view of the storing, warming and serving holder including a pivoting door according to the present invention.

FIG. 7 is a front view of a lift off door of the storing, warming and serving holder according to the present invention.

FIG. 8 is a side view of the lift off door of the storing, warming and serving holder according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
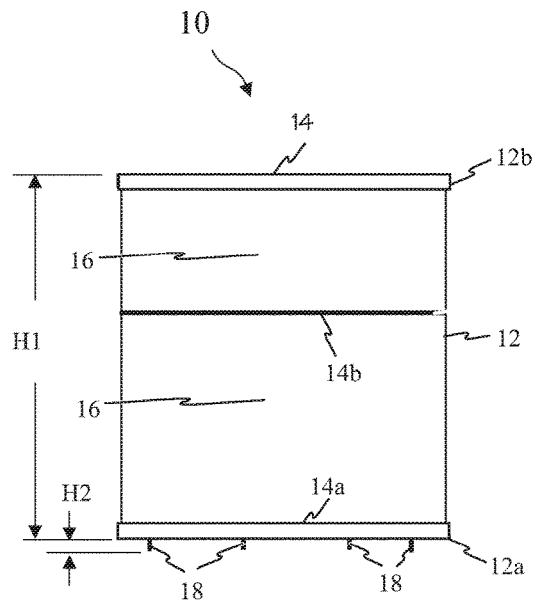
FIG. 1 is a front view of a storing, warming and serving holder according to the present invention.
Figure 2:
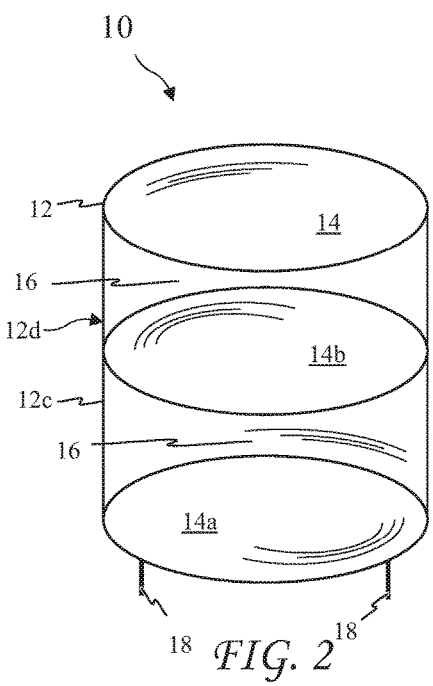
FIG. 2 is a front and top perspective view of the storing, warming and serving holder according to the present invention.
Figure 3:
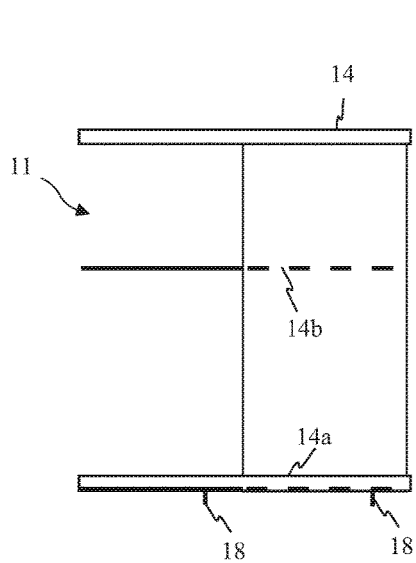
FIG. 3 is a side view of the storing, warming and serving holder according to the present invention.

FIG. 1 a front view of a storing, warming and serving holder 10, FIG. 2 shows a front and top perspective view of the storing, warming and serving holder 10, and FIG. 3 is a side view of the storing, warming and serving holder. The holder 10 is formed by a generally circumferential housing 12 having housing walls 12c having an exterior surface 12d and two or more generally circular shelves such a bottom shelf 14a and adjustable center shelf 14b which are removably attached to the housing 12. The bottom shelf 14a may be recessed upward into the housing 12 or at the bottom 12a of the housing 12. Legs 18 support the holder 10 above a support surface, for example, above a refrigerator shelf.

The storing, warming and serving holder 10 includes an open front 11. The open front 11 preferably has a span S (see FIG. 4) between 170 and 185 degrees and is more preferably about 180 degrees. Optionally, housing 12 may include three or more feet 18, or other suitable structures reaching down from the bottom 12a, reaching a height H2 below the bottom 12a to permit air circulation between holder 10 and the surface that is supporting it. An optional cover, top or lid 14 may be permanently or removably attached to a top 12b of the housing 12. The holder 10 has a height H1. The height H1 is preferably between 10 inches and 12 inches and more preferably 11 inches. The height H2 is preferably between ³⁄₁₆ inches and ½ inches and more preferably ¼ inches.

A food space 16 is enclosed by the lid 14, the bottom shelf 14a and the housing 12. Various food items may be supported by shelves 14a and 14b in the food space 16, for example, tortillas or pies. The housing 12 and/or the bottom and center shelves 14a and 14b may be solid, or woven or perforated material to enable air circulation through the food space 16. The holder 10 is preferably formed of materials suitable for use in a refrigerator, microwave and dishwasher.

Figure 4:
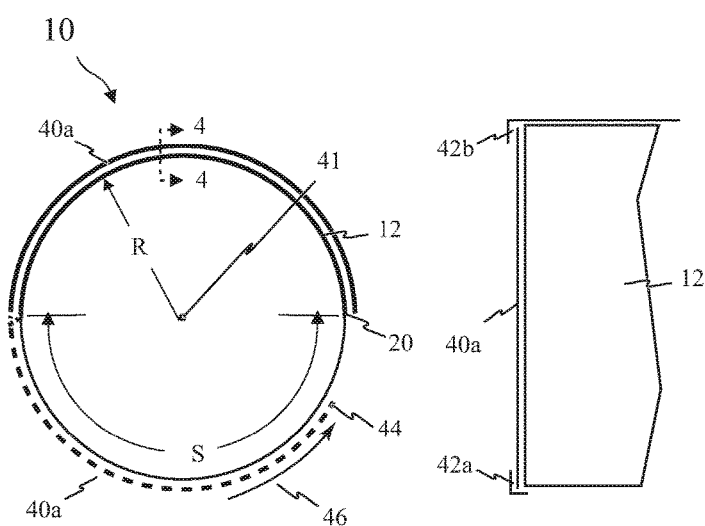
FIG. 4 is a top view of the storing, warming and serving holder including a sliding door according to the present invention.
Figure 5A:
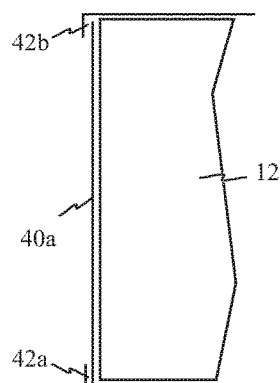
FIG. 5A is a cross-sectional view of the storing, warming and serving holder including a sliding door according to the present invention taken along line 5-5 of FIG. 4.

FIG. 4 shows a top view of the storing, warming and serving holder 10 including a sliding door 40a to enclose the food space 16 and FIG. 5A shows a cross-sectional view of the storing, warming and serving holder including a sliding door according to the present invention taken along line 5-5 of FIG. 4. The sliding door 40a slides between slots 42a and 42b at the bottom and top of the storing, warming and serving holder 10. The sliding door 40a is shown in solid lines in an open position and in dashed lines in a closed position. The sliding door 40a slides along an arc 46 until a leading edge 44 reached a housing edge 20. The bottom slot 42a may be a ring attached to the housing 12 or may be part of the housing 12. The top slot 42b may be part of the lid 14 or part of the housing 12. The holder 10 has a inside radius R. The radius R is preferably suitable for holding pies and/or tortillas, and is preferably between 9 inches and 10 inches and more preferably 9½ inches.

FIG. 5B is a cross-sectional view of the storing, warming and serving holder including a second sliding door 40a including a top 41, taken along line 5-5 of FIG. 4.

FIG. 6 shows a top view of the storing, warming and serving holder 10 having a pivoting door 40b to enclose the food space 16. The door 40b is sized and configured to rotate along arc 50 about a hinge 44 from an open position to a closed position with the edge 45 adjacent to the housing edge 20.

FIG. 7 is a front view of a lift off door 40c of the storing, warming and serving holder 10 and FIG. 8 is a side view of the lift off door 40c. A storing, warming and serving holder 10 including the lift off door 40c may or may not includes the lid 14, and may or may not include the bottom slot 42a helping to position the door 40c and allowing the door 40c to be rotated on the storing, warming and serving holder 10. A recessed knob 55a or handle 55b facilitates rotating or removing the door 40c. The recessed knob 55a does not interfere with placing a pie pan or the like on top of the holder.

Figure 9:
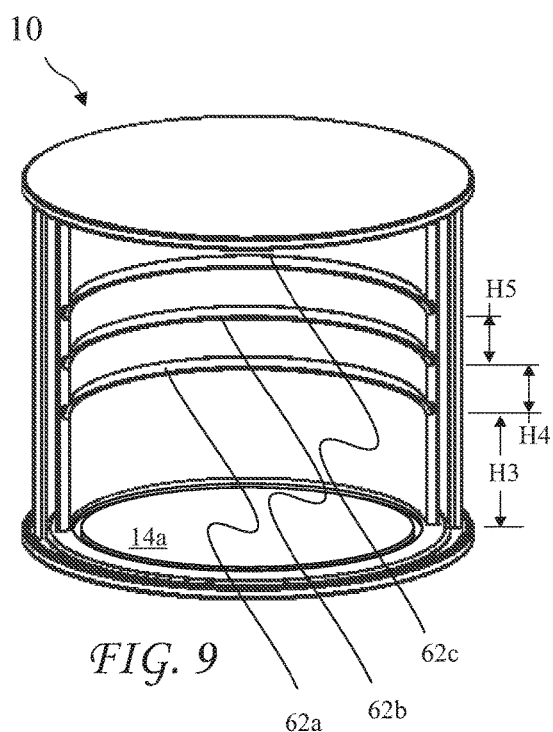
FIG. 9 shows a perspective view of the storing, warming and serving holder having three grooves for holding shelves according to the present invention.
Figure 10:
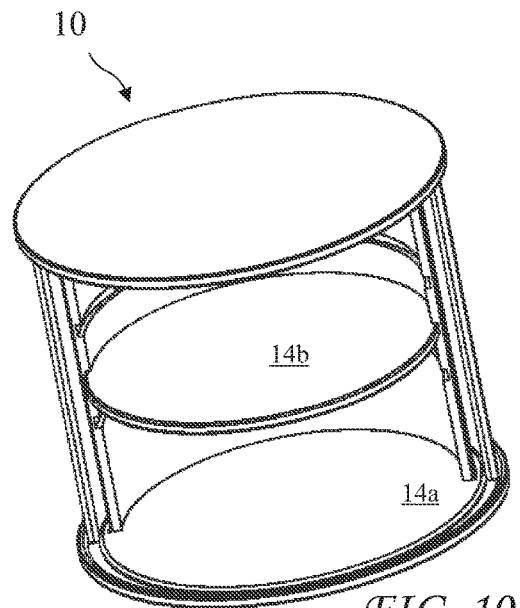
FIG. 10 shows a perspective view of the storing, warming and serving holder with a middle shelf in one of the three grooves according to the present invention.

A perspective view of the storing, warming and serving holder 10 having three grooves for holding middle shelves 14b is shown in FIG. 9 and a perspective view of the storing, warming and serving holder 10 with a middle shelf 14b in one of the three grooves is shown in FIG. 10. A first groove 62a is a height H3 above the bottom shelf 14a, a second groove 62b is a height H4 above the first groove 52a, and a third groove 62c is a height H5 above the second groove 52c. The height H3 is preferably between 5 and 6 inches and more preferably about 5¾ inches, and the height H4 and H5 are preferably between 2 and 3 inches and more preferably about 2½ inches. The housing 12 overlaps both the doors 40a, 40b and 40c and the wall 60 a Lateral Overlap (LO) of preferably between ½ inches and 1 inch, and more preferably about ¾ inches.

Figure 11:
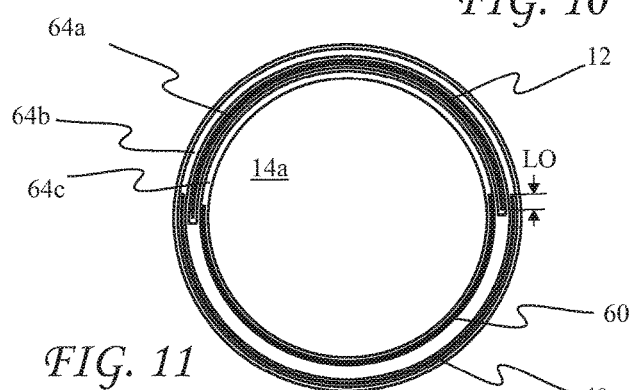
FIG. 11 shows a bottom shelf having grooves for positioning a door and a wall according to the present invention.

The bottom shelf 14a having grooves for positioning the door 40c (see FIGS. 7 and 8) and a wall 60 (see FIGS. 12, 13A, and 13B) is shown in FIG. 11. An outer groove 64b is provided for the door 40c, an intermediate groove 64b is provided to position the housing 12, and an inner groove 64c is provided for a wall 60.

Figure 13A:
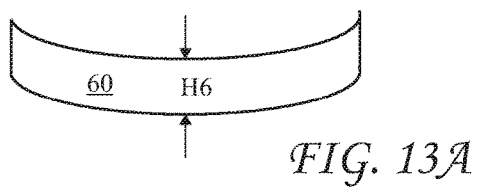
FIG. 13A shows a front view of the wall according to the present invention.
Figure 13B:
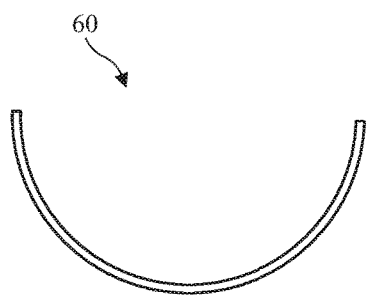
FIG. 13B shows a top view of the wall according to the present invention.
Figure 12:
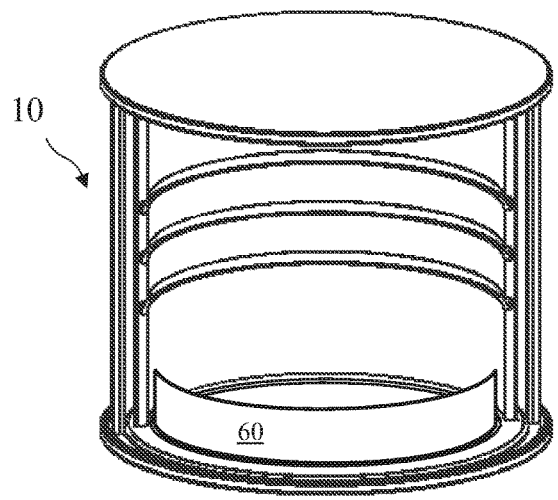
FIG. 12 shows a wall according to the present invention closing a bottom portion of the storing, warming and serving holder.

The wall 60 closing a bottom portion of the storing, warming and serving holder 10 is shown in FIG. 12, a front view of the wall 60 is shown in FIG. 13a, and a top view of the wall 60 is shown in FIG. 13B. The wall 60 has a height H6 is preferably between 2 and 3 inches and more preferably about 2¼ inches.

Those skilled in the art will recognize other door configurations, and a storing, warming and serving holder as shown in FIGS. 1 and 2 with other doors is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. A food storage, serving and warming holder comprising;
   a generally cylindrical housing having a wall, a bottom, a top, and an open front;
   a food space inside the housing;
   a bottom circular self at the housing bottom;
   one or more adjustable center circular shelves removably secured in the food space between the housing bottom and housing top;
   a lid removably or permanently attached to the housing top to enclose the food space; and
   a movable or removable door movably secured to the housing, for enclosing the food space, wherein:
   the door is the removable door and includes a circular door top covering the housing top.

2. The holder of claim 1, wherein the open front spans between 170 and 185 degrees.

3. The holder of claim 1, wherein at least three feet providing a gap between the bottom circular self and a surface the holder is supported by.

4. The holder of claim 1, further including a wall movable or removable from the holder, the wall enclosing a bottom portion of the food space.

5. The holder of claim 4, wherein:
   a bottom shelf resides at the bottom of the housing: and
   the wall rests in a groove in the bottom shelf.

6. The holder of claim 4, wherein the groove is circular and is inside the housing wall.

7. The holder of claim 4, wherein the wall laterally overlaps the housing by at least ½ inches in all positions of the wall.

8. The holder of claim 1, wherein the door includes a recessed knob for rotating or removing the door.

9. The holder of claim 1, wherein the feet reach down below the bottom between ³⁄₁₆ inches and ½ inches.

10. A food storage, serving and warming holder comprising;
    a generally cylindrical housing having a wall, a bottom, a top, and an open front;
    a food space inside the housing;
    a bottom circular self at the housing bottom;
    one or more adjustable center circular shelves removably secured in the food space between the housing bottom and housing top;
    a lid removably or permanently attached to the housing top to enclose the food space; and
    a movable or removable door movably secured to the housing, for enclosing the food space, wherein the door laterally overlaps the housing by at least ½ inches when the door is closed.

11. A food storage, serving and warming holder comprising;
- a generally cylindrical housing having a bottom, a top, and an open front spanning between 180 degrees;
- a food space inside the housing;
- four feet reaching down below the bottom ¼ inches;
- a bottom circular self at the housing bottom;
- one or more adjustable center circular shelves removably secured in the food space between the housing bottom and housing top;
- a lid removably or permanently attached to the housing top to enclose the food space and laterally overlapping the housing by ½ inches on both sides when the door is closed;
- a moveable wall positionable to close a bottom portion of the open front, the wall 2¼ inches high and laterally overlapping the housing by ½ inches on both side when laterally centered in the open front; and
- a movable or removable door movably secured to the housing, for enclosing the food space.

12. The holder of claim 11, wherein in the closed position, the door laterally overlaps the housing wall.

13. The holder of claim 12, wherein in the closed position, the door laterally overlaps an exterior surface of the housing wall.

14. The holder of claim 13, wherein in the closed position, the door laterally overlaps the exterior surface of the housing wall by at least ½ inches.

15. The holder of claim 11, wherein the door slides in a circular bottom slot in the bottom circular self outside the housing wall.

16. The holder of claim 11, wherein in the door further slides in a top slot in a housing lid at the top of the housing.

17. The holder of claim 16, wherein the bottom slot and the top slot circle the bottom circular self and the housing lid outside the housing wall.

\* \* \* \* \*